US011030675B2

(12) United States Patent
Kulkarni Wadhonkar et al.

(10) Patent No.: US 11,030,675 B2
(45) Date of Patent: Jun. 8, 2021

(54) SYSTEMS AND METHODS FOR AUTOMATED CHECKOUT IN A RETAIL FACILITY

(71) Applicant: Walmart Apollo, LLC, Bentonville, AR (US)

(72) Inventors: Mangesh N. Kulkarni Wadhonkar, Telangana (IN); Anandh Ravindran, Tamil Nadu (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/418,286

(22) Filed: May 21, 2019

(65) Prior Publication Data

US 2019/0355049 A1 Nov. 21, 2019

Related U.S. Application Data

(60) Provisional application No. 62/697,682, filed on Jul. 13, 2018.

(30) Foreign Application Priority Data

May 21, 2018 (IN) .............................. 201841018922

(51) Int. Cl.
*G06Q 30/00* (2012.01)
*G06Q 30/06* (2012.01)
(Continued)

(52) U.S. Cl.
CPC ..... *G06Q 30/0635* (2013.01); *G06K 7/10475* (2013.01); *G06K 9/00624* (2013.01); *G06K 19/0723* (2013.01); *G06Q 20/12* (2013.01)

(58) Field of Classification Search
CPC ................................................ G06Q 30/0635
(Continued)

(56) References Cited

U.S. PATENT DOCUMENTS 6,507,279 B2   1/2003  Loof
9,911,290 B1 *  3/2018  Zalewski ............. G06Q 20/327
(Continued)

OTHER PUBLICATIONS

Ratner, A. (May 5, 2003). Do-it-yourself checkout technology advances rapidly through retail world. Knight Ridder Tribune Business News Retrieved from https://search.proquest.com/wire-feeds/do-yourself-checkout-technology-advances-rapidly/docview/463098045/se-2?accountid=14753 (Year: 2003).*

(Continued)

*Primary Examiner* — Jason B Dunham
*Assistant Examiner* — Arielle E Weiner
(74) *Attorney, Agent, or Firm* — Fitch, Even, Tabin & Flannery LLP

(57) ABSTRACT

In some embodiments, a system for providing automated checkout at a retail facility comprises a plurality of portable RFID devices distributed to customers, a plurality of RFID readers configured to read the portable RFID devices, a plurality of cameras configured to capture images of products, and a control circuit configured to receive an indication of a membership identifier, receive an indication of a number of people in a group, associate the number of portable RFID devices with the membership identifier, wherein each person in the group receives one of the portable RFID devices, determine that an product has been selected, determine that one of the people in the group selected the product, update a virtual shopping cart based on the selection of the product, determine that a trigger condition has occurred, and automatically charge the customer for contents of the virtual shopping cart.

28 Claims, 3 Drawing Sheets

(51) Int. Cl.
*G06K 7/10* (2006.01)
*G06K 9/00* (2006.01)
*G06Q 20/12* (2012.01)
*G06K 19/07* (2006.01)

(58) Field of Classification Search
USPC ...................................................... 705/26.81
See application file for complete search history.

(56) References Cited

U.S. PATENT DOCUMENTS

| | | |
|---|---|---|
| 2012/0296751 A1 | 11/2012 | Napper |
| 2013/0211953 A1 | 8/2013 | Abraham |
| 2013/0282460 A1 | 10/2013 | Brosnan |
| 2013/0284806 A1* | 10/2013 | Margalit ............... G06Q 30/06 235/382 |
| 2014/0164176 A1* | 6/2014 | Kitlyar ............... G06Q 30/0633 705/26.8 |
| 2014/0201042 A1 | 7/2014 | Meyer |
| 2014/0214564 A1* | 7/2014 | Argue ............... G06Q 30/0633 705/16 |
| 2014/0214596 A1* | 7/2014 | Acker, Jr. ............... G06Q 20/20 705/26.8 |
| 2015/0006308 A1 | 1/2015 | Lin |
| 2015/0039458 A1* | 2/2015 | Reid ................... G06K 9/00335 705/26.1 |
| 2015/0073907 A1* | 3/2015 | Purves .................. G06Q 20/32 705/14.58 |
| 2015/0278830 A1* | 10/2015 | Zamer ................ G07C 9/00904 705/7.29 |
| 2016/0023675 A1 | 1/2016 | Hannah |
| 2017/0161703 A1 | 6/2017 | Dodia |

OTHER PUBLICATIONS

Everseen AI; "0Line: Checkout-Free Shopping"; https://www.youtube.com/watch?time_continue=1&v=TIYVfkvjWuE; published Oct. 28, 2017; pp. 1-3.

Nallapureddy, Bhaskar, et al.; "Future of Self Checkout"; http://scet.berkeley.edu/wp-content/uploads/UCB-ELPP-Future-of-Self-Checkout-Report.pdf; pp. 1-27.

Pavaluru, Pradeep; "From Shopping Cart to SMART Kart"; https://pos.report/whitepapers/from-shopping-cart-to-smart-kart/813; pp. 1-8.

PCT; App. No. PCT/US2019/031978; International Search Report and Written Opinion dated Jul. 19, 2019.

* cited by examiner

SYSTEMS AND METHODS FOR AUTOMATED CHECKOUT IN A RETAIL FACILITY

CROSS-REFERENCE TO RELATED APPLICATION

This application claims the benefit of U.S. Provisional Application No. 62/697,682, filed Jul. 13, 2018, and Indian Provisional Application Number 201841018922, filed May 21, 2018, which are all incorporated by reference in their entirety herein.

TECHNICAL FIELD

This invention relates generally to automated systems in a retail facility and, more particularly, to automated checkout systems in a retail facility.

BACKGROUND

Many customers find waiting in line at a brick-and-mortar retail facility to be frustrating and time consuming. While a well-planned retail facility can make it easier for customers to locate products that they wish to purchase, the shopping process can be slowed by long lines at checkout. These long lines may prevent customers from purchasing products, or visiting a retail facility, resulting in lost sales. For example, a customer may choose to forego a purchase if he or she believes that the line will be long, or opt to shop online instead of visiting a retail facility to avoid lines. Consequently, a need exists for faster checkout systems.

BRIEF DESCRIPTION OF THE DRAWINGS

Disclosed herein are embodiments of systems, apparatuses, and methods pertaining to automated checkout at a retail facility. This description includes drawings, wherein.

Figure 1:
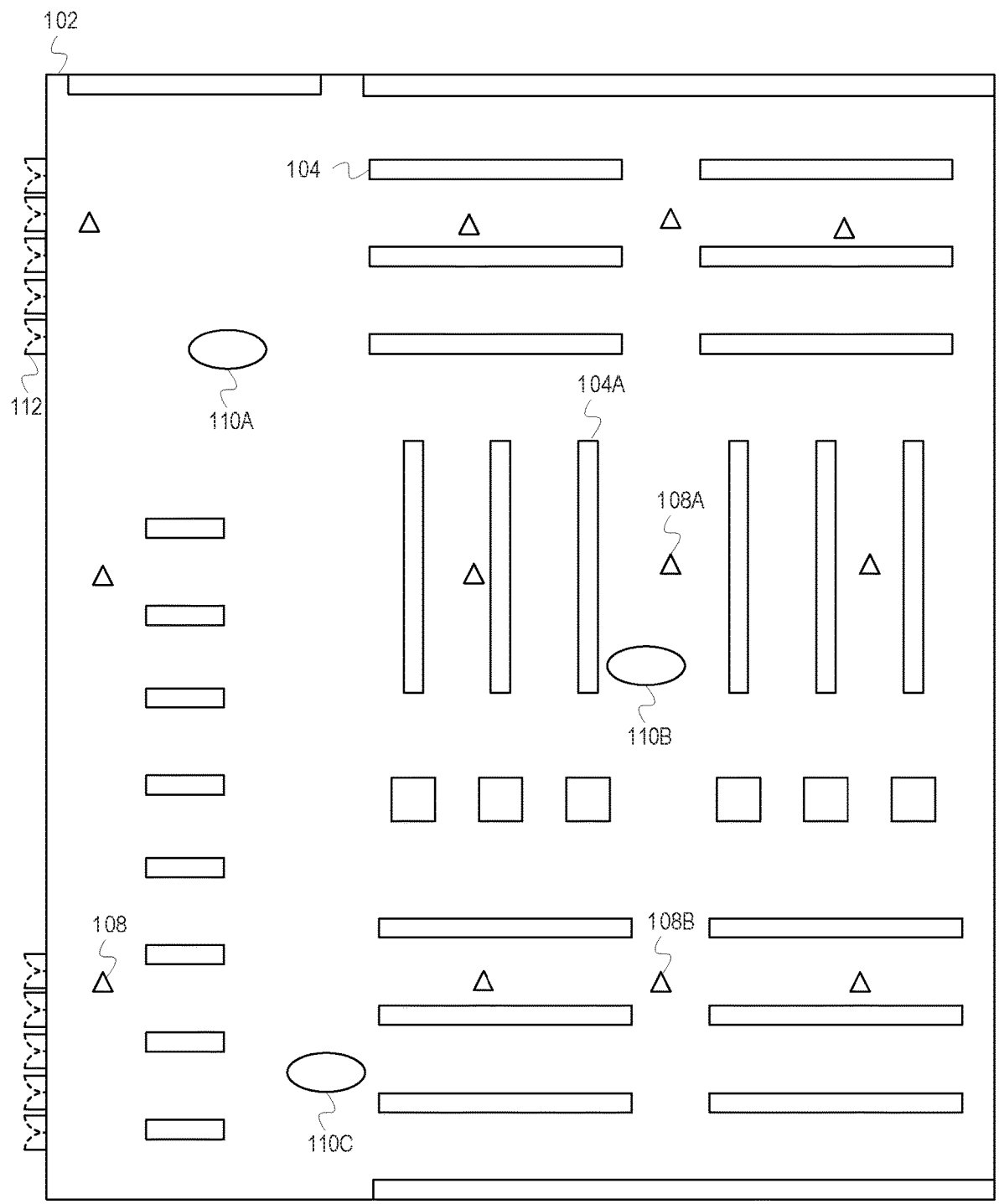
FIG. 1 depicts a retail facility 102 including radio frequency identification (RFID) readers 108 for use in an automated checkout system, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to automated checkout at a retail facility. In some embodiments, a system for providing automated checkout at a retail facility comprises a plurality of portable radio frequency identification (RFID) devices, wherein each portable RFID device of the plurality of portable RFID devices includes an RFID tag, and wherein the plurality of RFID devices are distributed to customers as the customers enter the retail facility, a plurality of RFID readers, the plurality of RFID readers located about the retail facility, wherein the plurality of RFID readers is configured to read the RFID tags included with the plurality of RFID devices, a plurality of cameras, the plurality of cameras located on product display units in the retail facility, wherein the plurality of cameras is configured to capture images of products on the product display units, and a control circuit, the control circuit communicatively coupled to the plurality of RFID readers and the plurality of cameras, wherein the control circuit is configured to receive an indication of a membership identifier associated with a customer, receive, from the customer, an indication of a number of people in a group associated with the customer, associate the number of portable RFID devices with the membership identifier associated with the customer, wherein each person in the group associated with the customer receives one of the number of portable RFID devices, determine, based on input received from at least one of the plurality of cameras, that an product has been selected, determine, based on input from at least one of the RFID readers, that one of the people in the group associated with the customer selected the product, update a virtual shopping cart based on the selection of the product, wherein the virtual shopping cart is associated with the group associated with the customer, determine that a trigger condition has occurred, and in response to the determination that the trigger condition has occurred, automatically charge the customer for contents of the virtual shopping cart.

As previously discussed, long lines can deter customers from shopping in brick-and-mortar retail facilities. Because of this deterrent effect, some brick-and-mortar retail facilities have experienced decreased sales. If the checkout process can be avoided, not only will it help to restore sales, but may also drive new sales. For example, if customers can avoid the checkout process at a specific retailer, the customers may choose to shop at that specific retailer instead of other retailers. Embodiments of the systems, methods, and apparatuses described herein seek to avoid long checkout lines by way of an automated checkout process. In some embodiments, this automated checkout process allows customers to simply select the products that they wish to purchase and leave the retail facility. When the customer is done shopping, he or she is automatically charged for the products selected. Additionally, in some embodiments, the systems, methods, and apparatuses allow customers to shop collaboratively. For example, a father and son may be shopping together. The system can track products selected by both the father and the son. When products are selected by either the father or the son, a virtual shopping cart is updated to include the product. When the father and son are done shopping, an account associated with either the father or the son is charged for the products selected. Finally, in some embodiments, such an automated checkout shopping experience can be provided with technology that already exists within a retail facility (i.e., without the need to install new and likely expensive equipment). The discussion of FIG. 1 provides and overview of such automated checkout at a retail facility.

FIG. 1 depicts a retail facility 102 including radio frequency identification (RFID) readers 108 for use in an automated checkout system, according to some embodiments. The RFID readers 108 are located about the retail facility 102. The RFID readers 108 read RFID tags included with portable RFID devices. The example depicted in FIG. 1 includes three portable RFID devices: a first portable RFID device 110A, a second portable RFID device 110B, and a third portable RFID device 110C. Each of the portable RFID devices is carried by a customer as the customer shops in the retail facility 102. The portable RFID devices can be any suitable device that is capable of being transported by a customer and include an RFID tag. For example, the portable RFID devices can be cards, bands, bracelets, fobs, mobile devices (e.g., smartphones), smart watches, etc.

When a customer enters the retail facility and wishes to participate in the automated checkout process, the customer is provided with a portable RFID device. In some embodiments, the automated checkout process is account-based. For example, a customer has an account (i.e., membership identifier) with the retailer, a specific retail facility, a third party (e.g., a business that manages accounts for multiple retailers), etc. When the customer is provided with a portable RFID device, the portable RFID device is associated with the customer's account. If the customer is shopping collaboratively (e.g., in a group), each member with whom the customer is shopping is provided with a portable RFID device. For example, if a mother and father are shopping with a teenage child and an infant child and the mother, father, and teenage child will be participating in shopping duties, three portable RFID devices are provided to the group (i.e., one for the mother, one for the father, and one for the teenage child). Each of the three portable RFID devices is associated with the customer's (e.g., the mother's) membership identifier. In some embodiments, the customer provides information regarding the number of people in the group. With respect to the example provided above, the mother would provide an indication that three people will be shopping collaboratively. The customer can provide this information while en route to the retail facility 102 (e.g., via a mobile device, possible running an application associated with the customer's account or retailer) or upon arrival at the retail facility 102 (e.g., via the mobile device or a kiosk within the retail facility). As one example, an application associated with the retailer can generate an identifier (e.g., a barcode) when the customer indicates that he or she will be visiting the retail facility 102 to shop. Additionally, the customer can indicate the number of people, if any, that will be shopping with the customer. The customer can then scan the identifier when he or she enters the retail facility 102 to initiate the distribution of portable RFID devices and the shopping experience.

Once the people in the group have received the portable RFID devices, the people can traverse the retail facility 102 and shop. As the people shop, their locations can be detected via the RFID readers 108. The system can determine locations of the people based on reads of the RFID tags included with the portable RFID devices. For example, the system can use the locations of the RFID readers 108 that read the RFID tags and, in some embodiments, triangulation, to determine the location of the people. As one example, a first RFID reader 108A may read the second portable RFID device 110B. Because the location of the first RFID reader 108A is known and the first RFID reader 108A is reading the second portable RFID device 110B, it can be inferred that the second portable RFID device is near the first RFID reader 108A. This information may be sufficient to determine the location of the second portable RFID device 110B. However, if more precise location information is needed or desired, readings from additional ones of the RFID readers 108 can be used to determine the location of the second portable RFID device 110B. For example, a second RFID reader 108B and a third RFID reader (and possibly others of the RFID readers 108) may read the second portable RFID device 110B (i.e., the RFID tag associated with the second portable RFID device 110B). Based on these reads, the system can determine a more accurate location of the second portable RFID device 110B (e.g., within a few meters or possibly centimeters).

The retail facility 102 includes a number of product display units 104. The product display units 104 can include shelves, cases, racks, endcaps, features, etc. and are located about the retail facility 102. The product display units 104 house and/or present products for sale. The product display units include cameras (described in more detail with respect to FIG. 2). The cameras are located on (i.e., mounted in, on, and/or around) the product display units 104. The cameras 112 are configured to capture images of the products. Based on these images, the identity of the products on the product display units 104 can be determined. For example, the products can be identified based on image recognition technologies, identifiers (e.g., barcodes, two dimensional barcodes, thermal barcodes, character recognition, etc.). When a product is selected, the product is identified. Additionally, because the customer's locations are known, the system can determine which customer selected the product. For example, as discussed above, it can be determined that the second portable RFID device 110B is near a first product display unit 104A. In some embodiments, the system can even determine that the second portable RFID device 110B is near a far end of the first product display unit 104A. If the camera 212 detected selection of a product that is located at the far end of the first product display unit 104A, it can be determined that a person carrying the second portable RFID device 110B selected the product.

In some embodiments, the retail facility 102 can also include weight sensors. The weight sensors are located on (i.e., mounted in, on, and/or around) the product display units 104. The weight sensors can be used to verify the identity of the product selected. For example, if based on the cameras it appears that a twelve pack of soda has been selected, measurements received from the weight sensors can confirm this. That is, if the input received from the cameras indicates that a twelve pack of soda has been removed from one of the product display units 104 and the measurement received from a weight sensor associated with the one of the product display units 104 indicates a change in weight of approximately four and half kilograms, the confidence that a twelve pack of soda has been selected can be increased. Additionally, or alternatively, the weight sensors can be used to determine a quantity of the product selected. For example, if the input received from the cameras indicates that a twelve pack of soda has been selected and the measurement from the weight sensor indicates a change in weight of approximately nine kilograms, it can be determined that two twelve packs of soda were selected.

Additionally, in some embodiments, the system can employ "smart carts." The smart carts are carts, baskets, etc. that are equipped with sensors, such as RFID readers, cameras, weight sensors, etc. The smart carts can be used to verify the identity of products selected. In some embodiments, the smart carts are associated with the customer (i.e., the customer's account). If the smart cart includes RFID readers and a product placed in the smart cart by the customer includes an RFID tag, the smart cart can read the product as it is placed in the smart cart. This information can be verified with the contents of the virtual shopping cart and used to increase the confidence in the accuracy of the contents of the smart cart. In some embodiments, the smart cart can include weight sensors. The weight sensors can be used to verify the identity of products selected. For example, if a customer selects product that weighs one kilogram, it is expected that an item weighing one kilogram will be placed in the smart cart. If the weight sensors in the smart cart record a product having a weight of one kilogram being added, this can verify the identity of the product selected.

Figure 2:
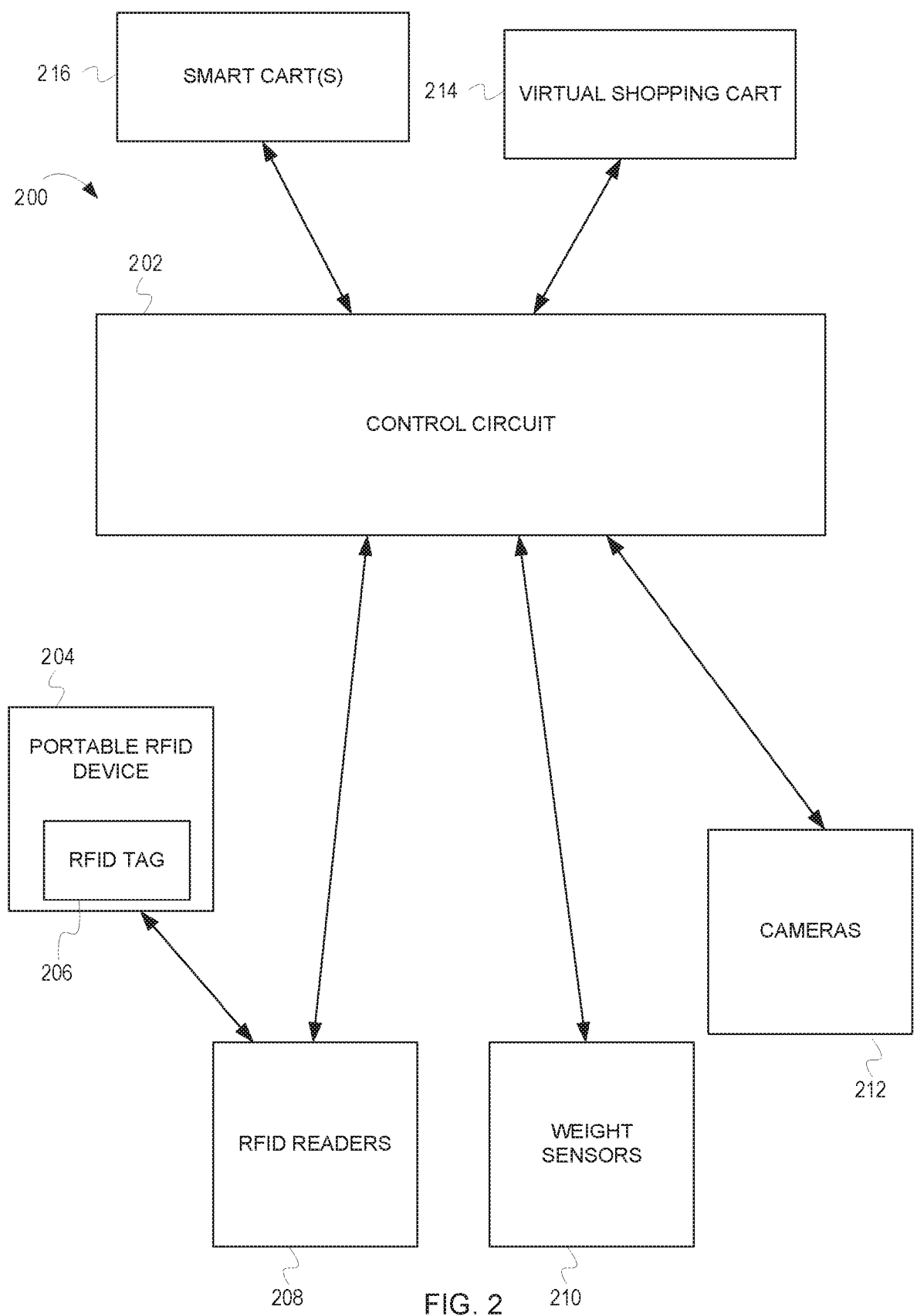
FIG. 2 is a block diagram of a system 200 for providing automated checkout in a retail facility, according to some embodiments.

Next, the product is added to a virtual shopping cart (discussed in more detail with respect to FIG. 2). The virtual shopping cart is associated with a customer's account. The virtual shopping cart is a fluid list of the products selected by the customer, as well as his or her companions if any. Returning to the example of the mother, father, and teenage child shopping collaboratively, if the second portable RFID device 110B is associated with one of the mother, the father, and the teenage child, the system can add the product to a virtual shopping cart associated with the mother upon selection of the product selected by the customer carrying the second portable RFID device 110B. This process continues as the customers shop in the retail facility 102.

In some embodiments, the system can also determine when a customer returns a product to one of the product display units 104. In one form, this process is quite similar to the selection of a product by a customer. For example, one of the cameras can detect that a product has been placed on one of the product display units 104. As previously discussed, the camera is used to identify the product. Based on the locations of customers in the retail facility, it can be determined which customer has placed the product on the product display unit 104. Accordingly, that product can be removed from the virtual shopping cart associated with the customer that returned the product to the product display unit 104.

Once the customer, and his or her companions if any, have finished shopping, the account associated with the customer is automatically charged for the contents of the virtual shopping cart (i.e., the products selected) associated with the account (i.e., associated with the group associated with the customer). In some embodiments, the customer (i.e., the account associated with the customer) is charged for the contents of the virtual shopping cart upon occurrence of a trigger condition. The trigger condition can be any condition suitable to indicate that the customer, and his or her companions if any, have finished shopping. For example, the trigger condition can be receipt of all portable RFID devices associated with the account. Alternatively, of additionally, the trigger condition can be based on a location of one or more customers. For example, a customer leaving the retail facility 102 can be the trigger condition. If the system employs smart carts, a location of the smart cart can be used to determine that the customer has left the retail facility 102. As another example, the trigger condition can be receipt of an indication from the customer that he or she has finished shopping.

In some embodiments, the account includes payment information. For example, the payment information can be saved by the customer. In such embodiments, the customer can be charged via the saved payment information. Additionally, the customer may be able to save multiple payments methods, have preferred payment methods (e.g., based on a transaction type, retailer, etc.), spending limits, etc. Additionally, or alternatively, the customer can be charged by way of an invoice. For example, when the customer has finished shopping, an invoice can be generated based on the contents of the virtual shopping cart and sent to the customer (e.g., via mail, email, text, etc.).

While the discussion of FIG. 1 provides an overview of automated checkout at a retail facility, the discussion of FIG. 2 provides additional details regarding a system for use in providing automated checkout at a retail facility.

FIG. 2 is a block diagram of a system 200 for providing automated checkout in a retail facility, according to some embodiments. The system 200 includes a control circuit 202, a portable RFID device 204, RFID readers 208, weight sensors 210, cameras 212, a virtual shopping cart 214, and in some embodiments, smart carts 216. The RFID readers 208, weight sensors 210, cameras 212, and virtual shopping cart 214 can be communicatively coupled to the control circuit 202 via, for example, a network. Additionally, in some embodiments, the portable RFID device 204 can also be communicatively coupled to the control circuit 202 via, for example, the network. The network can be of any suitable type, such as a wide area network (WAN) (e.g., the Internet) or a local area network (LAN).

The control circuit 202 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. The control circuit 202 is configured (for example, by using corresponding programming as will be well understood by those skilled in the art) to carry out one or more of the steps, actions, and/or functions described herein.

By one optional approach the control circuit 202 operably couples to a memory. The memory may be integral to the control circuit 202 or can be physically discrete (in whole or in part) from the control circuit 202 as desired. This memory can also be local with respect to the control circuit 202 (where, for example, both share a common circuit board, chassis, power supply, and/or housing) or can be partially or wholly remote with respect to the control circuit 202 (where, for example, the memory is physically located in another facility, metropolitan area, or even country as compared to the control circuit 202).

This memory can serve, for example, to non-transitorily store the computer instructions that, when executed by the control circuit 202, cause the control circuit 202 to behave as described herein. As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM)).

The portable RFID devices 204 are distributed to customers as the customers enter a retail facility. The portable RFID devices 204 are associated with customer accounts. For example, a customer may have an account with a retailer. When, or before, one of the portable RFID devices 204 is provided to the customer, the portable RFID device 204 is associated with the customer's account (i.e., the portable RFID device 204 is associated with a membership identifier associated with the customer). If the customer is shopping in a group, each member (or some of the members) in the group is provided with a portable RFID device 204. Each of these portable RFID devices 204 are associated with the membership identifier associated with the customer. For example, if the group includes six people, six portable RFID devices 204 are associated with the customer's membership identifier. The portable RFID devices 204 can be uniquely identifiable (e.g., by number, RFID, etc.). The unique identifier is used to associate the portable RFID devices 204 with the customer's membership identifier.

The portable RFID devices 204 include RFID tags 206. The RFID tags 206 transmit identifiers to the RFID readers 208. The RFID readers 208 are located about the retail facility. Reads of the RFID tags 206 by the RFID readers 208 are used to determine locations of the portable RFID devices 208. Accordingly, reads of the RFID tags 206 by the RFID readers 208 can be used to locate customers that carry the portable RFID devices 204.

As a customer traverses the retail facility, he or she selects products that he or she would like to purchase. The selection of a product is determined by the cameras 212. The cameras 212 are mounted on product display units. The cameras 212 can employ image recognition, character recognition, scanning, etc. to identify the product selected. For example, the cameras 212 can capture an image of a product as it is selected and transmit the image of the product to the control circuit 202. The control circuit 202 can compare the image of the product with images in a database to identify the product. Additionally, or alternatively, the cameras 212 can capture an image of a barcode on or associated with the product and transmit the image of the barcode to the control circuit 202. The control circuit 202 can use the image of the barcode to identify the product, for example, by referencing a database. In some embodiments, the cameras 212 can capture images of customers as the customers select products. The image of the customers can be used to identify customers selecting products. For example, a database can store images of customers and the control circuit 202 can use facial recognition to identify the customers. Additionally, in some embodiments, one or more of the cameras 212 can be located at entrances to the retail facility. In such embodiments, the cameras 212 can capture images of customers as the customers enter the retail facility. These images can be stored in the database for later use in identifying customers as the customers select products.

The identification of customers based on images captured by the camera 212 can be done in addition to, or in lieu of, the identification of customers based on reads of the RFID tags 206 associated with the portable RFID devices 204. As previously discussed, the RFID readers 208, in concert with the RFID tags 206, can be used to locate customers in and around the retail facility. When, based on input received from one or more of the cameras 212, the control circuit 202 determines that a product has been selected, the control circuit, based on input received from the RFID readers 208, can determine which customer has selected the product. For example, the control circuit 202 knows the locations of the cameras 212. Additionally, based on the reads of the RFID tags 206 by the RFID readers 208, the control circuit 202 can determine the locations of the portable RFID devices 204, and thus the customers, in and around the retail facility. For example, when input, from one of the cameras 212 located at Location A, indicates that product has been selected and the input from the RFID readers 208 indicates that Customer X is near Location A, the control circuit 202 can determine that Customer X selected product A. As previously discussed, this determination can be bolstered if the one of the cameras at Location A captures and image of Customer X as Customer X selects the product.

Upon identifying the product selected and the customer that has selected the product, the control circuit 202 updates a virtual shopping cart 214 associated with the customer to include the product. If multiple people are shopping in a group, if any member of the group selects the product, the control circuit 202 updates the virtual shopping cart 214 that is associated with the group to include the product. In this manner, the contents of the virtual shopping cart 214 include all products selected by the customer and a group with which the customer is associated. In some embodiments, the customer, as well as any people in the group associated with the customer, can view the contents of the virtual shopping cart 214. For example, the customer may be able to access the virtual shopping cart 214 via his or her mobile device by way of a browser or application dedicated to the retail facility.

Once the customer, and group members if any, have finished shopping, the control circuit 202 automatically charges the customer for the contents of the virtual shopping cart 214. The control circuit 202 determines that the customer has finished shopping based on the occurrence of a trigger condition. The trigger can condition can be any suitable event. For example, the trigger condition can be receipt of the portable RFID devices 204 provided to the customer (and group members if any), the customer leaving the retail facility, the customer indicating that he or she is finished shopping, etc.

Figure 3:
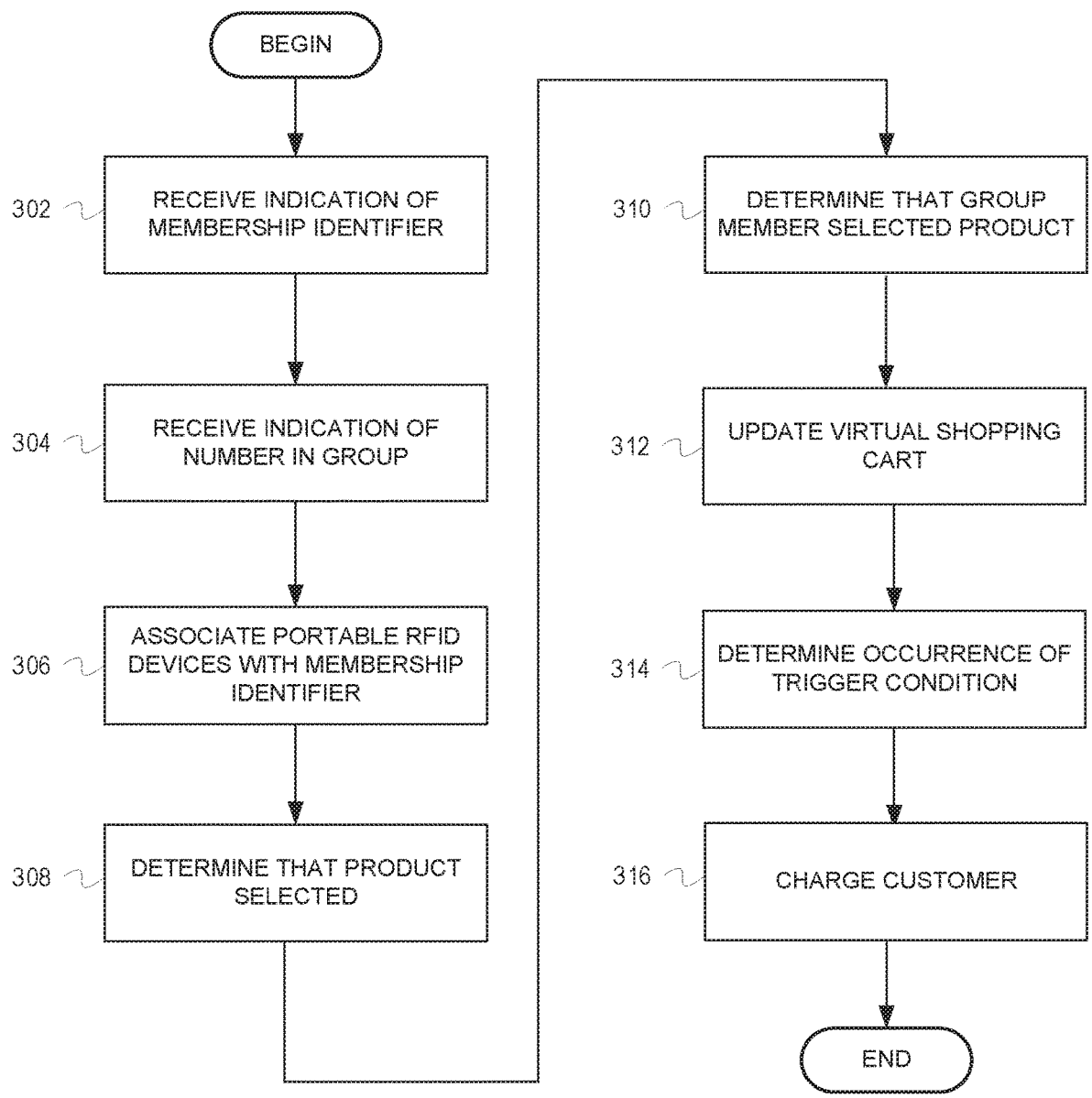
FIG. 3 is a flow diagram including example operations for providing automated checkout at a retail facility, according to some embodiments.

While the discussion of FIG. 2 provides details regarding a system for providing automated checkout, the discussion of FIG. 3 describes example operations of a system for providing automated checkout.

FIG. 3 is a flow diagram including example operations for providing automated checkout at a retail facility, according to some embodiments. The flow begins at block 302.

At block 302, an indication of a membership identifier is received. For example, a control circuit can receive the indication of the membership identifier. The indication of the membership identifier can be transmitted from a mobile device associated with a customer or a device in a retail facility, such as a kiosk. In some embodiments, the customer can transmit the indication of the membership identifier to the control circuit from his or her mobile device to indicate that he or she plans to shop at the retail facility, or can present the indication of the membership identifier upon entering the shopping facility (e.g., a barcode on his or her mobile device). The membership identifier is associated with a customer (e.g., an account associated with the customer). The membership identifier can be for a retail facility, a group of retail facilities, a third party (e.g., a business that manages automated shopping accounts), etc. The flow continues at block 304.

At block 304, an indication of a number of people in a group is received. For example, the control circuit can receive the indication of the number of people in the group. The people in the group intend to shop together (i.e., collaboratively). For example, if the customer plans to shop with three other people, the indication of the number of people would indicate that four people planned to shop together (i.e., the customer and his or her three companions). In some embodiments, the control circuit receives the indication of the number of people in the group with the indication of the membership identifier. Alternatively, after receiving the indication of the membership identifier, the control circuit can transmit a request for an indication of the number of people in the group. If the customer plans to shop alone, the number of people in the group is one (i.e., the customer). The flow continues at block 306.

At block 306, portable RFID devices are associated with the membership identifier. For example, the control circuit can associate the portable RFID devices with the membership identifiers. The same number of portably RFID devices are associated with the membership identifier as the number of people in the group. For example, if the group includes three people, three RFID devices are associated with the membership identifier. The portable RFID devices include unique identifiers. In some embodiments, the unique identifiers are identifiers associated with RFID tags included in the portable RFID devices. The portable RFID devices can be any type of device suitable for including an RFID tag and being carried by customers. The flow continues at block 308.

At block 308, it is determined that a product is selected. For example, the control circuit can determine that the product was selected. In some embodiments, the retail facility includes a plurality of cameras. The cameras are mounted on product display units in and around the retail facility. The cameras capture images of products on the product display units. These images are transmitted to the control circuit. Based on these images, the control circuit can determine when a product has been selected. For example, if the images transmitted to the control circuit are a continuous stream, the control circuit can detect changes in the image. Additionally, or alternatively, the cameras can be motion activated and transmit images when motion is detected. In either case, the control circuit determines that the product has been selected. In some embodiments, this determination includes an identification of the product. In such embodiments, the control circuit can identify the product selected based on image recognition, character recognition, barcode scanning, etc. The flow continues at block 310.

At block 310, it is determined that a group member selected the product. For example, the control circuit can determine that the group member selected the product. This determination is made based on reads of the RFID tags included in the portable RFID devices. The retail facility includes a plurality of RFID readers. The RFID readers are located about the retail facility. The RFID readers are configured to read the RFID tags included in the portable RFID devices. Based on the RFID reads, the control circuit can determine the locations of customers. Specifically, the control circuit can determine which customer selected the product based on the locations of the customers. Additionally, as the portable RFID devices are associated with membership identifiers, the control circuit can determine to which group the customer that selected the product belongs. The flow continues at block 312.

At block 312, a virtual shopping cart is updated. For example, the control circuit can update the virtual shopping cart. The control circuit updates the virtual shopping cart to include the product selected. The virtual shopping cart is common to the group. For example, if the group includes one member, the virtual shopping cart is specific to that single member. However, if the group includes multiple members, the virtual shopping cart is common to all members in the group. That is, any product selected by one of the members is added to the virtual shopping cart. The flow continues at block 314.

At block 314, the occurrence of a trigger condition is determined. For example, the control circuit can determine the occurrence of the trigger condition. The trigger condition can be any event suitable to indicate that the customer is, and any group members shopping with the customer are, done shopping. For example, the trigger condition can be the receipt of the portable RFID devices. That is, when all of the portable RFID devices associated with the group are returned it can indicate that the members of the group are done shopping. Additionally, if the portable RFID devices are not retuned upon the completion of shopping (e.g., the portable RFID devices are membership cards that are kept by the customers), the trigger condition can occur when the customer, and any members of the group if any, leave the retail facility. In such embodiments, the control circuit can determine the location of the customers based on the portable RFID devices to determine that the trigger condition has occurred. The flow continues at block 316.

At block 316, the customer is automatically charged for the contents of the virtual shopping cart. For example, the control circuit can charge the customer for the contents of the virtual shopping cart. In some embodiments, the account includes payment information. For example, the payment information can be saved by the customer. In such embodiments, the customer can be charged via the saved payment information. Additionally, the customer may be able to save multiple payments methods, have preferred payment methods (e.g., based on a transaction type, retailer, etc.), spending limits, etc. Additionally, or alternatively, the customer can be charged by way of an invoice. For example, when the customer has finished shopping, an invoice can be generated based on the contents of the virtual shopping cart and sent to the customer (e.g., via mail, email, text, etc.).

Although the examples referred to herein describe using RFID technology to determine locations of customers and/or items, it should be noted that any suitable transmission technology can be used. That is, any type of receiver (e.g., RFID readers, ultrawide band (UWB) receivers, etc.) and any type of transmitter (e.g., RFID tags, UWB transmitters, etc.) can be used to determine locations of customers and/or items. For example, any radio frequency technology can be used, such as spread spectrum, ultrawide band (UWB), etc. In some embodiments, these additional technologies can be used in concert with the RFID readers and RFID tags. That is, for example, both RFID and UWB technology can be used to determine locations of items and/or customers. Alternatively, UWB (or any other suitable technology) can be used in place of RFID technology. That is, UWB receivers (generally referred to as "receivers") and UWB transmitters (generally referred to as "transmitters") can be used in place of RFID readers and RFID tags, respectively.

In some embodiments, a system for providing automated checkout at a retail facility comprises a plurality of portable radio frequency identification (RFID) devices, wherein each portable RFID device of the plurality of portable RFID devices includes an RFID tag, and wherein the plurality of RFID devices are distributed to customers as the customers enter the retail facility, a plurality of RFID readers, the plurality of RFID readers located about the retail facility, wherein the plurality of RFID readers is configured to read the RFID tags included with the plurality of RFID devices, a plurality of cameras, the plurality of cameras located on product display units in the retail facility, wherein the plurality of cameras is configured to capture images of products on the product display units, and a control circuit, the control circuit communicatively coupled to the plurality of RFID readers and the plurality of cameras, wherein the control circuit is configured to receive an indication of a membership identifier associated with a customer, receive, from the customer, an indication of a number of people in a group associated with the customer, associate the number of portable RFID devices with the membership identifier associated with the customer, wherein each person in the group associated with the customer receives one of the number of portable RFID devices, determine, based on input received from at least one of the plurality of cameras, that an product has been selected, determine, based on input from at least one of the RFID readers, that one of the people in the group associated with the customer selected the product, update a virtual shopping cart based on the selection of the product, wherein the virtual shopping cart is associated with the group associated with the customer, determine that a trigger condition has occurred, and in response to the determination that the trigger condition has occurred, automatically charge the customer for contents of the virtual shopping cart.

In some embodiments, an apparatus and a corresponding method performed by the apparatus comprises receiving, at a control circuit, an indication of a membership identifier associated with a customer, receiving, at the control circuit, an indication of a number of people in a group associated with the customer, associating, by the control circuit, the number of portable radio frequency identification (RFID) devices with the membership identifier associated with the customer, wherein each person in the group associated with the customer receives one of the number of portable RFID devices, wherein each of the number of portable RFID devices includes an RFID tag, determining, by the control circuit based on input received from a camera, that an product has been selected, wherein the camera is located on a product display unit, determining, by the control circuit based on input received from an RFID reader, that one of the people in the group associated with the customer selected the product, wherein the RFID reader is part of a plurality of RFID readers located about the retail facility, updating, by the control circuit, a virtual shopping cart based on the selection of the product, wherein the virtual shopping cart is associated with the group associated with the customer, determining, by the control circuit, that a trigger condition has occurred, and in response to determining that the trigger condition has occurred, automatically charging the customer for content of the virtual shopping cart.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

The systems, methods, and apparatuses disclosed herein can be configured to comply with privacy requirements which may vary between jurisdictions. For example, before any image capture, customer identification, facial recognition, etc., a "consent to capture" process may be implemented. In such a process, consent may be obtained, from the customer, via a registration for a service. Part of the registration process may be to ensure compliance with the appropriate privacy laws for the location where the service would be performed. No unauthorized collection of biometric data of individuals occurs via exemplary systems and methods.

What is claimed is:

1. A system for providing automated checkout at a retail facility, the system comprising:
 a plurality of portable radio frequency identification (RFID) devices, wherein each portable RFID device of the plurality of portable RFID devices includes an RFID tag, and wherein the plurality of portable RFID devices are distributed to customers as the customers enter the retail facility;
 a plurality of RFID readers, the plurality of RFID readers located about the retail facility, wherein the plurality of RFID readers is configured to read the RFID tags included with the plurality of portable RFID devices;
 a plurality of cameras, the plurality of cameras located on product display units in the retail facility, wherein the plurality of cameras is configured to capture images of products on the product display units; and
 a control circuit, the control circuit communicatively coupled to the plurality of RFID readers and the plurality of cameras, wherein the control circuit is configured to:
  receive an indication of a membership identifier associated with a customer;
  receive, from the customer, an indication of a number of people in a group associated with the customer;
  generate, based on the indication of the membership identifier and the number of people in the group associated with the customer, a session identifier, wherein the session identifier is associated with the membership identifier and includes an indication of the number of people in the group associated with the customer for a particular shopping session;
  receive an indication of the session identifier;
  in response to receipt of the indication of the session identifier, associate the number of portable RFID devices with the membership identifier associated with the customer, wherein each person in the group associated with the customer receives one of the number of portable RFID devices;
  determine, based on input received from at least one of the plurality of cameras, that a product has been selected;
  identify, based on the input received from the at least one of the plurality of cameras, the product that has been selected;
  determine, based on input from at least one of the RFID readers, that one of the people in the group associated with the customer selected the product;
  update a virtual shopping cart based on the selection of the product, wherein the virtual shopping cart is associated with the group associated with the customer;
  determine that a trigger condition has occurred; and
  in response to the determination that the trigger condition has occurred, automatically charge the customer for contents of the virtual shopping cart.

2. The system of claim 1, further comprising:
 a plurality of weight sensors, the plurality of weight sensors located on the product display units, wherein the plurality of weight sensors is configured to monitor weight of products on the product display units.

3. The system of claim 2, wherein the control circuit is further configured to:
 receive, from at least one of the plurality of weight sensors, a measurement; and
 determine, based on the measurement, a quantity of the product selected.

4. The system of claim 1, wherein the control circuit is further configured to:
 determine, based on second input from at least one of the plurality of cameras, that the product has been returned to a shelf; and update the virtual shopping cart to remove the product from the virtual shopping cart.

5. The system of claim 1, wherein the trigger condition is receipt of an indication that the number of portable RFID devices has been returned.

6. The system of claim 1, further comprising a smart cart, wherein the smart cart includes at least one of cameras and RFID readers, wherein the control circuit is further configured to:
   receive, from the smart cart, an indication of the product; and
   verify that the product has been placed in the smart cart.

7. The system of claim 6, wherein the control circuit is further configured to:
   determine a location of the smart cart.

8. The system of claim 7, wherein the trigger condition is based on the location of the smart cart.

9. The system of claim 1, wherein the indication of the membership identifier associated with the customer is received from a device associated with the customer.

10. The system of claim 1, wherein the determination that one of the people in the group selected the product is based on one or more of a location of the one of the people in the group and an image captured of the one of the people in the group.

11. The system of claim 1, wherein the input received from the at least one of the plurality of cameras includes an image of the product that has been selected, wherein the image of the product that has been selected includes a product identifier, and wherein the product that has been selected is identified based on the product identifier.

12. The system of claim 1, wherein the input received from the at least one of the plurality of cameras includes an image of the product that has been selected, and wherein the product that has been selected is identified based on image recognition.

13. The system of claim 1, further comprising:
   a kiosk, wherein the kiosk includes a scanner, wherein the scanner is configured to read the session identifier.

14. The system of claim 13, wherein the session identifier is an optically readable identifier, wherein the scanner is an optical scanner, and wherein the optically readable identifier is presented via a mobile device associated with the customer.

15. The system of claim 1, wherein the control circuit receives, from the customer, the indication of the number of people in the group associated with the customer before the customer reaches the retail facility.

16. A method for providing automated checkout at a retail facility, the method comprising:
   receiving, at a control circuit, an indication of a membership identifier associated with a customer;
   receiving, at the control circuit, an indication of a number of people in a group associated with the customer;
   generating, based on the indication of the membership identifier and the number of people in the group associated with the customer, a session identifier, wherein the session identifier is associated with the membership identifier and includes an indication of the number of people in the group associated with the customer for a particular shopping session;
   receiving the session identifier;
   in response to receipt of the session identifier, associating, by the control circuit, the number of portable radio frequency identification (RFID) devices with the membership identifier associated with the customer, wherein each person in the group associated with the customer receives one of the number of portable RFID devices, wherein each of the number of portable RFID devices includes an RFID tag;
   determining, by the control circuit based on input received from a camera, that a product has been selected, wherein the camera is located on a product display unit;
   identifying, based on the input received from the camera, the product that has been selected;
   determining, by the control circuit based on input received from an RFID reader, that one of the people in the group selected the product, wherein the RFID reader is part of a plurality of RFID readers located about the retail facility;
   updating, by the control circuit, a virtual shopping cart based on the selection of the product, wherein the virtual shopping cart is associated with the group associated with the customer;
   determining, by the control circuit, that a trigger condition has occurred; and
   in response to the determining that the trigger condition has occurred, automatically charging the customer for contents of the virtual shopping cart.

17. The method of claim 16, further comprising:
   receiving, from a weight sensor, a measurement, wherein the weight sensor is located on the product display unit; and
   determining, based on the measurement, a quantity of the product selected.

18. The method of claim 16, further comprising:
   determining, based on second input from the camera, that the product has been returned to a product display unit; and
   updating the virtual shopping cart to remove the product from the virtual shopping cart.

19. The method of claim 16, wherein the trigger condition is receipt of an indication that the number of portable RFID devices has been returned.

20. The method of claim 16, further comprising:
   receiving, from a smart cart, an indication of the product; and
   verifying, by the control circuit, that the product has been placed in the smart cart.

21. The method of claim 20, further comprising:
   determining, by the control circuit based on an RFID read, a location of the smart cart.

22. The method of claim 21, wherein the trigger condition is based on the location of the smart cart.

23. The method of claim 16, wherein the indication of the membership identifier associated with the customer is received from a device associated with the customer.

24. The method of claim 16, wherein the determining that one of the people in the group selected the product is based on one or more of a location of the one of the people in the group and an image captured of the one of the people in the group.

25. The method of claim 16, wherein the input received from the at least one of the plurality of cameras includes an image of the product that has been selected, wherein the image of the product that has been selected includes a product identifier, and wherein the product that has been selected is identified based on the product identifier.

26. The method of claim 16, wherein the input received from the at least one of the plurality of cameras includes an image of the product that has been selected, and wherein the product that has been selected is identified based on image recognition.

27. The method of claim 16, further comprising:
reading, by a scanner associated with a kiosk, the session identifier.

28. The method of claim 27, wherein the session identifier is an optically readable identifier, wherein the scanner is an optical scanner, and wherein the optically readable identifier is presented via a mobile device associated with the customer.

\* \* \* \* \*